R. A. ADAMSON.
APPARATUS FOR SCRAPING AND CLEANING WATER MAINS, PIPES, AND THE LIKE.
APPLICATION FILED MAY 27, 1910.

1,030,634.

Patented June 25, 1912.

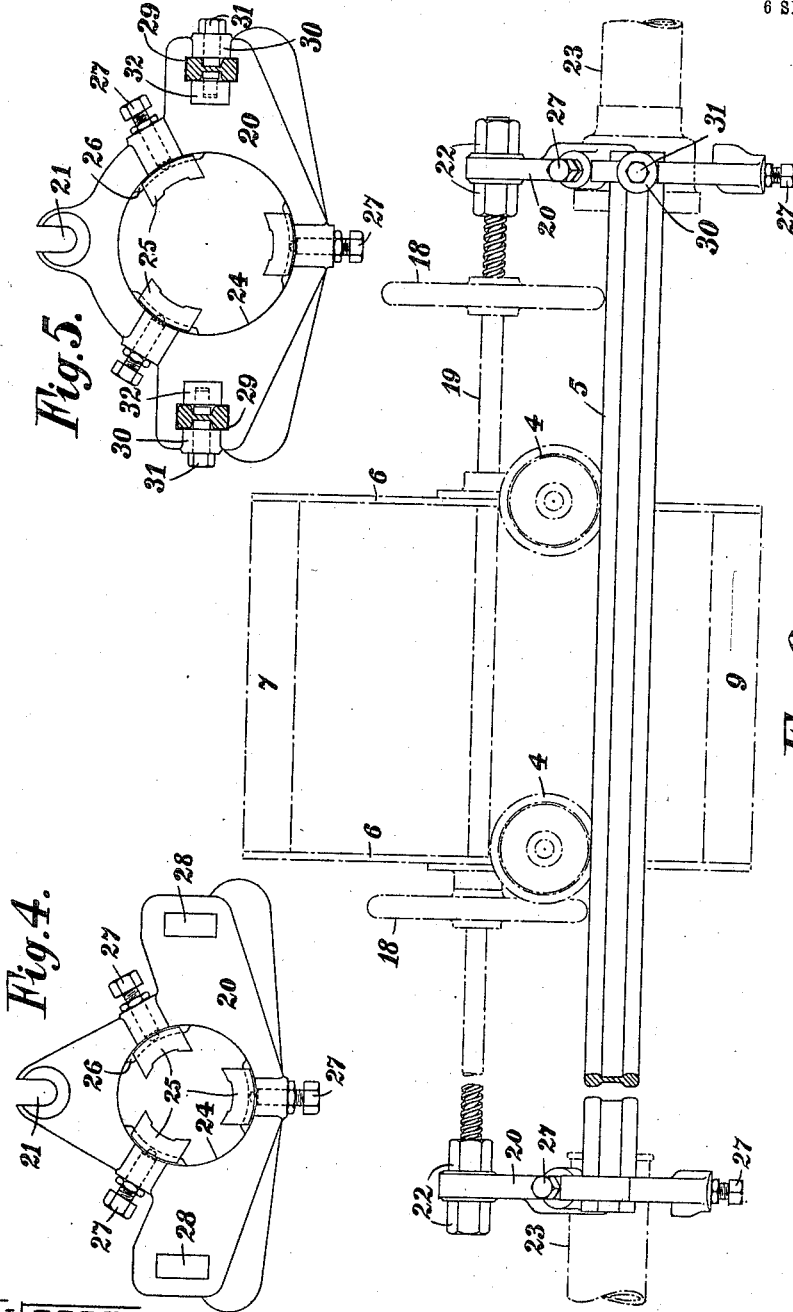

R. A. ADAMSON.
APPARATUS FOR SCRAPING AND CLEANING WATER MAINS, PIPES, AND THE LIKE.
APPLICATION FILED MAY 27, 1910.
1,030,634.
Patented June 25, 1912.
6 SHEETS—SHEET 4.
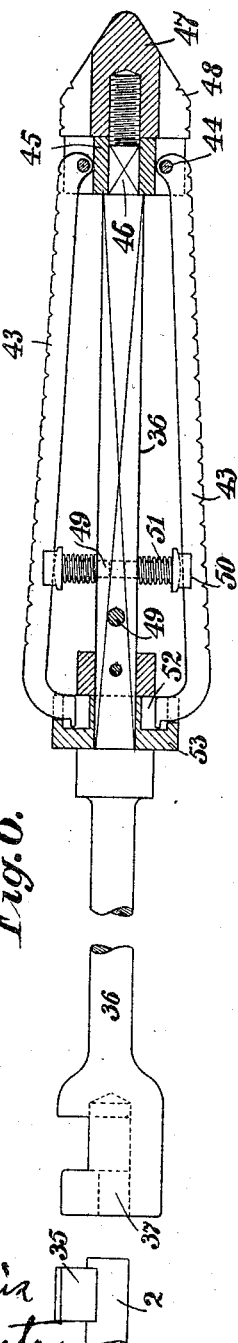
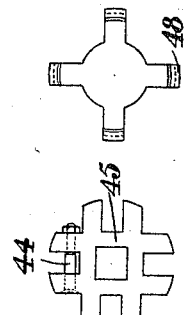
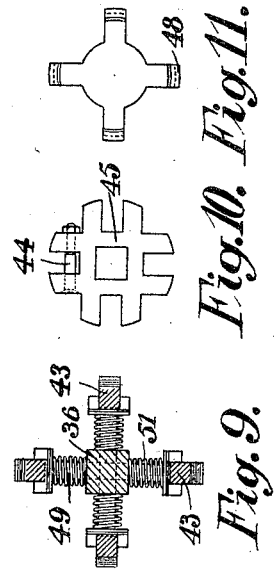
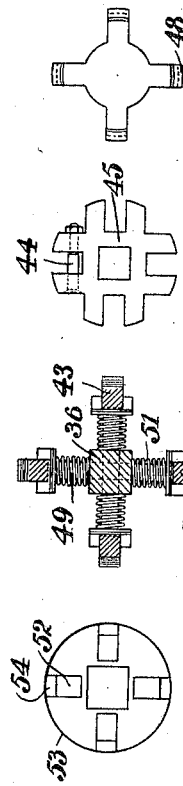
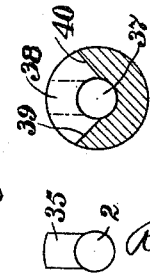

R. A. ADAMSON.
APPARATUS FOR SCRAPING AND CLEANING WATER MAINS, PIPES, AND THE LIKE.
APPLICATION FILED MAY 27, 1910.

1,030,634.

Patented June 25, 1912.

6 SHEETS—SHEET 5.

Witnesses
Albert Popkins
Grace P. Brereton

Inventor
Richard A. Adamson
By Sturtevant & Mason
Attorneys.

COLUMBIA PLANOGRAPH CO., WASHINGTON, D. C.

R. A. ADAMSON.
APPARATUS FOR SCRAPING AND CLEANING WATER MAINS, PIPES, AND THE LIKE.
APPLICATION FILED MAY 27, 1910.

1,030,634.

Patented June 25, 1912.

6 SHEETS—SHEET 6.

Witnesses
Albert Popkins
Grace P. Brereton

Inventor
Richard A. Adamson
By Sturtevant & Mason
Attorneys.

UNITED STATES PATENT OFFICE.

RICHARD A. ADAMSON, OF RIVINGTON, NEAR BOLTON, ENGLAND.

APPARATUS FOR SCRAPING AND CLEANING WATER MAINS, PIPES, AND THE LIKE.

1,030,634.  Specification of Letters Patent.  Patented June 25, 1912.

Application filed May 27, 1910. Serial No. 563,693.

*To all whom it may concern:*

Be it known that I, RICHARD ANTHONY ADAMSON, a subject of the King of Great Britain, residing at Rivington, near Bolton, in the county of Lancaster, in the Kingdom of England,, have invented certain new and useful Improvements in Apparatus for Scraping and Cleaning Water Mains, Pipes, and the Like, of which the following is a specification.

This invention has for its object certain improvements in machines for scraping and cleaning the interior of water pipes, drain pipes and the like when *in situ.*

My improvements are applied to machines of the type in which a shaft carrying a cutter is rotated by power, and at the same time advanced to cut or scrape away incrustation or accumulated dirt. In this type of machine a trench is made in the ground so as to expose the pipe to be scraped, a length of the said pipe is removed, and the machine is placed in the trench with its shaft which drives the cutters in line with the two ends of the divided pipe. The shaft is rotated, and at the same time the machine caused to travel longitudinally so as to urge the scrapers along the pipe.

Figure 1:
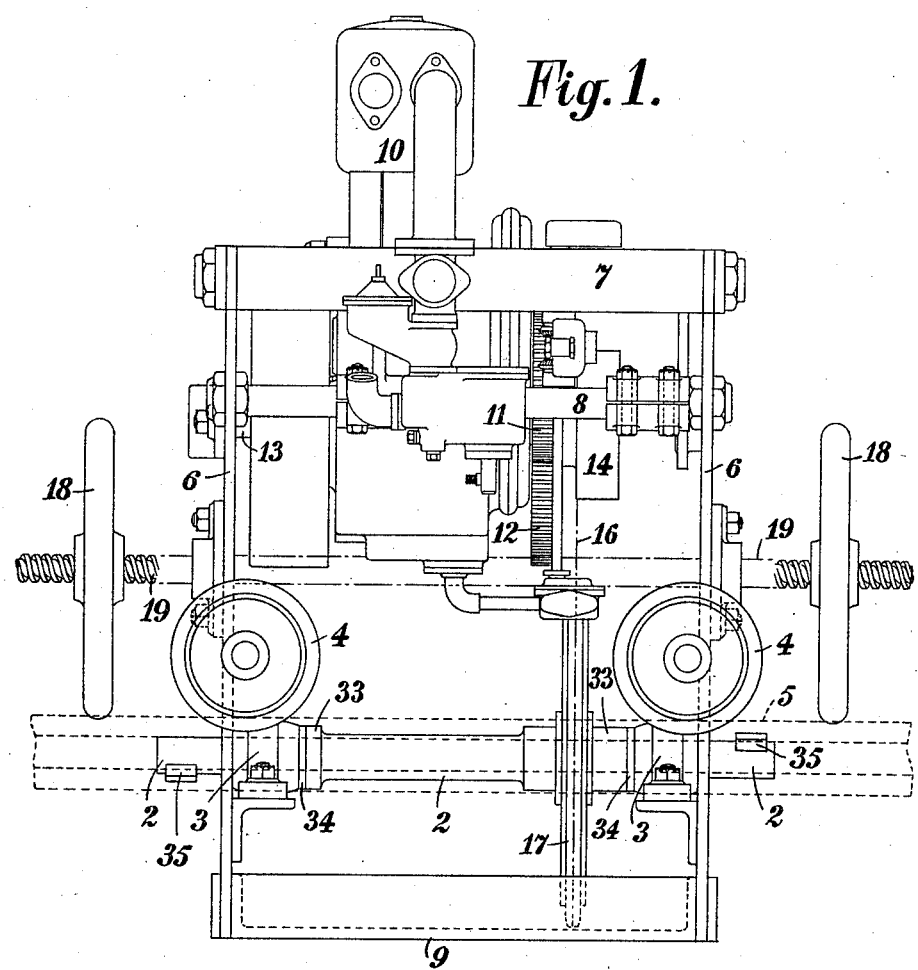
Figure 2:
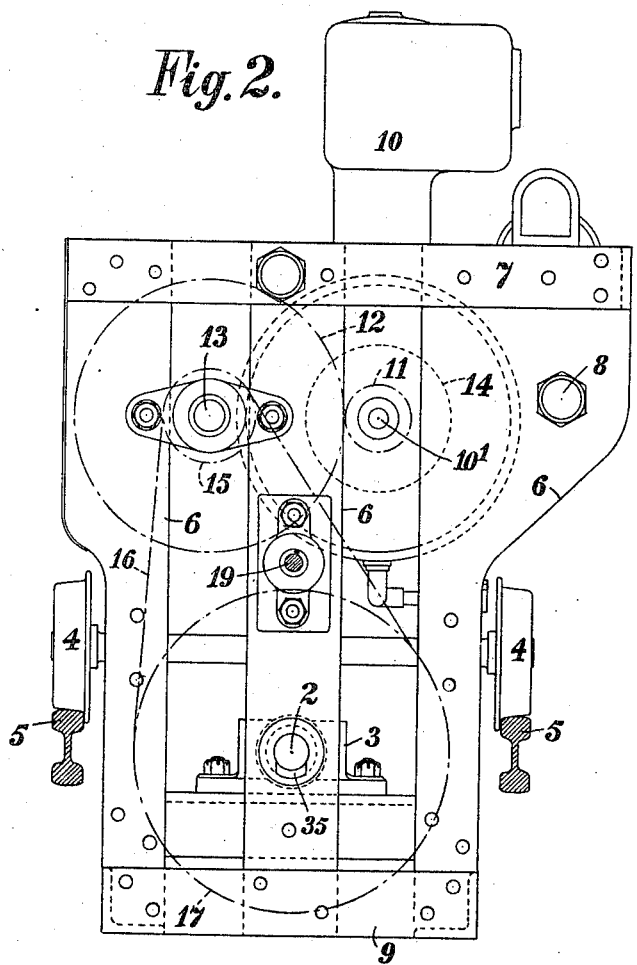
Figure 12:
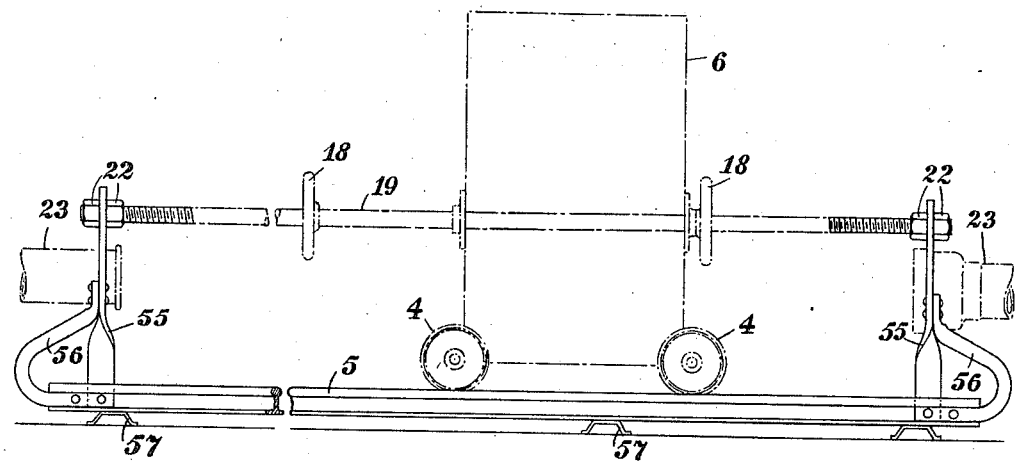
Figure 13:
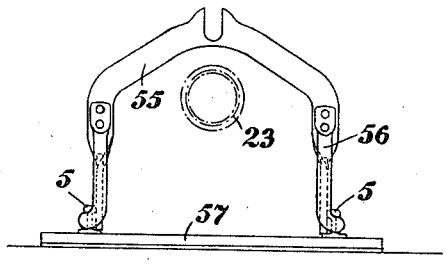
Figure 15:
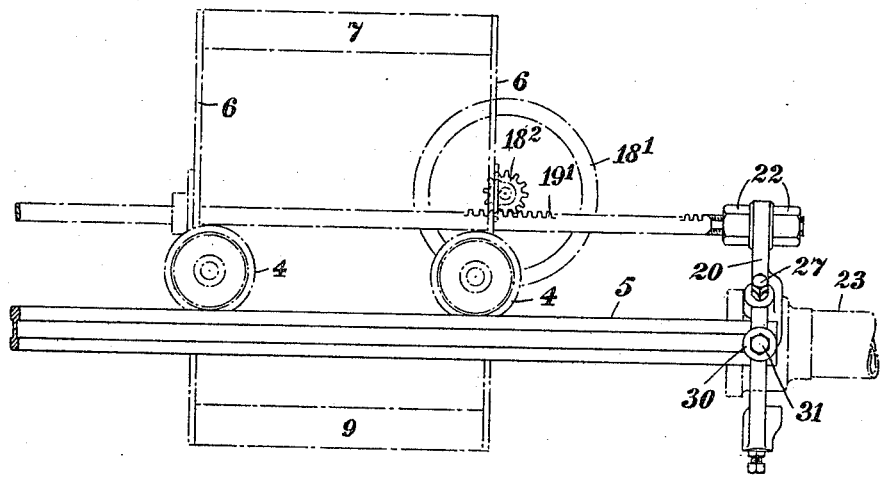

In the drawings:—Figure 1 is a front elevation of my improved pipe-scraping apparatus as designed for actuation by an engine; Fig. 2, an end elevation; Fig. 3, a side elevation showing the method of fixing the supporting rails in the trench, and the screw shaft of the hand traversing mechanism; Figs. 4 and 5, face views of the clamping frames 20 in which the screw shaft of the traversing mechanism, and the supported rails are secured; Fig. 6, a sectional elevation of the scraper showing also the coupling device; Fig. 7, an end view and Fig. 7ª cross-section of the shaft -member and socket member of the coupling device respectively. Fig. 8, a face view of the disk for engaging the ends of the cutter blades; Fig. 9, a detail view of the spring device for holding the cutter blades extended; Fig. 10, a face view of the sleeve in which the cutter blades are pivoted; Fig. 11, an end view of the conical cutter head; Fig. 12, a side elevation showing an arrangement for mounting the rails in the bottom of the trench below the pipe; Fig. 13 an end view thereof; Fig. 14, a cross section of one of the types of cutter blades; Fig. 15 a front elevation showing another arrangement for feeding the moving member longitudinally.

My improved apparatus (reference being first had to Figs. 1 to 11) is constructed as follows:—2, is the shaft which drives the cutter bars. It is journaled at 3 in bearings in a carriage which is provided with wheels 4 rolling on a pair of rails 5, these rails 5 being so fixed, that the shaft 2 shall, when the apparatus is placed in the trench, be in line with, the pipe to be scraped, said pipe being divided for that purpose, and the carriage being adapted to travel upon the rails 5, in the direction of the length of the pipe, so as to urge the scraper along the pipe. The carriage in which the shaft 2 is journaled, embodies plates 6 spaced apart and stayed together by spacing bars or pieces, such as 7, 8 and 9, and this carriage carries a petrol engine such as 10 of any suitable construction with all the necessary accessories. The engine and its accessory parts and driving gear are placed between the side plates 6 of the carriage said plates being spaced far enough apart for the purpose. This makes the machine handier to use and easier to transport from place to place. The engine drives a shaft 10′, which drives by gearing (preferably 1–4) such as a pinion 11 and spur wheel 12 the shaft 13, said shaft 10′ being journaled in the vertical plates 6 of the carriage and 13 being journaled in a bearing plate bolted to an outside and an intermediate plate. The pinion 11 can be thrown into and out of gear with the shaft 10′ by means of a clutch 14. The shaft 13 carries a sprocket wheel 15, the latter driving by means of a chain 16 and sprocket wheel 17 the shaft 2 that drives the cutter bars, and which is in line with the pipe to be scraped.

The carriage 6 inclosing the driving mechanism is moved along the rails 5 by means of a hand wheel 18 operating on a bar 19 having a screw thread of large pitch throughout the whole or major part of its length, this bar 19 passing freely through holes in the side plates 6 and being firmly bolted at the ends to a pair of frames 20, said frames being provided with slots 21 to receive the ends of the said bar 19 and be locked therein by nuts 22, one at each side. The said frames are placed in the trench and are clamped to the two ends of the pipe 23 to be scraped in the following manner. Each frame has an opening 24 large enough to receive the pipe ends, and inside this opening 24 are clamping blocks 25 held in guides 26. These blocks 25 can be forced against the pipe by means of pins 27, and so firmly bind the frames 20 on to the pipe ends. It will be noticed that the hole 24 in one of the frames is larger than the hole in the other frame. This is to enable one frame to fit on to the socket end of one pipe end, and the other frame to fit onto the spigot end of the other pipe end. The ends of the rails 5 on which the apparatus travels, are also fixed in position in these frames 20. The rails at one end enter the rectangular holes 28, and at the other end, the holes 29. Adjacent to the holes 29 are lugs 30 in the frame 20, and through these lugs 30, and through holes in the rails 5, pins 31 are passed, the ends being screwed into lugs 32 at the opposite side of the rails, or set pins may be used. This locks the rails in position.

Two hand wheels 18 are provided on the screw shaft, one on each side of the carriage 6 for moving the apparatus in both directions on the rails 5. The hand wheels are readily operated to move the carriage in one direction or the other, while leaving the machine as compact as possible. One hand wheel having been turned so as to clear the carriage as shown in Fig. 3, the other hand wheel is brought up to the carriage, so that its center abuts against a boss on the carriage, and the carriage can thus be fed along by hand.

The shaft 2 driving the cutter bar is arranged approximately centrally with respect to the rails 5. The shaft 2 is formed with suitable collars 33 for taking the thrust, 34 being brass liners between these thrust collars and the journal bearings 3. The shaft 2 has means at both ends for engaging rods that drive the cutters or scrapers. Thus two cutter rods may be used at the same time, so that the pipe can be cleaned in both directions without reversing, and there is no idle stroke. This coupling consists of a plug and socket joint of the double-bayonet type. While in ordinary bayonet joints, the plug carrying the lug is pushed into the socket, and then rotated in one direction in order to engage, my joint is made so that the two parts can be locked by rotation in either direction. To effect this, I make the end of the shaft 2 with a strong lateral fin or blade 35 and the end of the rod 36 with a longitudinal socket 37 to receive the end of the shaft 2, also with a slot 38 to receive the fin or blade 35. The slot 38 beyond the end of the rod 36 is widened or beveled off at both sides, viz. at 39 and 40. Thus, by sleeving the rod 36 longitudinally over the end of the shaft the end of the shaft 2, enters the socket 37, and the blade 35 enters the slot 38, then by turning one way, the blade 35 enters the beveled-off or widened side 39 of the slot 38, and the two parts become locked so that the blade 35 will drive the rod 36, or if turned the other way the blade 35 enters the other widened or beveled off part 40 and drives the rod 36 the other way. By this means the shaft and rod are coupled together and the rotation of the shaft 2 revolves the scraper within the pipe to remove scale or other deposit. When it is required to lengthen the rod 36 the end of the said rod is uncoupled from the shaft 2, and a length of bar is inserted between 2 and 36, said lengthening bar being provided with a socket at one end to engage the shaft 2 and with a blade at the other end to engage the socket at end of the rod 36. Any number of lengthening bars can be introduced, they are interchangeable, they can be firmly coupled together, and at the same time can be readily uncoupled when desired. Each lengthening bar is preferably about six feet long.

The cutters or scrapers are built up upon the rod 36, and are formed of cutter blades 43 hinged at 44 to the jaws of a sleeve 45 which is applied to the square part 46 of the rod 36. At the forward end of the rod 36 is a conical head 47 screwed thereon, this head having 2 or more cutting edges 48 to give a lead to the scraper blades 43. The cutter blades are rectangular in cross section, and may be hollow ground at the sides as shown in Fig. 14, and they may have transverse serrations of any desired pitch on their outer faces.

49 are two pairs of pins entering holes in the central rod 36 of the cutter, and provided with heads 50 which engage the cutter blades 43. Around these pins 49 are helical springs 51 bearing at one end against the central rod 36 and the other end against the heads 50 in such a manner as to keep the cutter blades 43 pressed against the inside of the tube. The ends of the bars nearest the springs are bent inward, and enter slots 52 in a disk 53 mounted on the squared part of the rod 36. This disk is provided with a shoulder 54 which in conjunction with the lips 59 on the blades prevents the cutters from opening sufficiently to allow the springs to become detached. The springs keep the blades extended sufficiently to cut away incrustation, but allow them to give should any solid obstruction be met with. When it is required to scrape a pipe of a different diameter, the conical head 47 is unscrewed, the sleeve 45 with its blades is taken off, and the disk 53 is removed. A disk of a different diameter is put on, also springs 51 of a different length are applied, and the same cutter blades replaced, and thus the same cutters can be used to scrape pipes of different sizes.

The operation of the machine is as follows:—The plates 20 with their rails 5 having been fixed in position in the trench, the carriage 6 with its appurtenances is lowered into the trench until its wheels rest on the rails and the screw shaft enters the slots 21. The nuts 22 are tightened up. The shaft 2 is now in line with the ends of the broken pipe 23. The carriage is rolled back to one end of the rails 5, and a lengthening bar is coupled to one end of the driving shaft 2 by the bayonet joint, and the cutter rod 36 coupled to the forward end of the lengthening bar, also by the bayonet joint. The driving mechanism is started, and the carriage carrying the latter gradually advanced by turning one of the handles 18. When the other end of the rails 5 is reached, a cutter rod 36 and a lengthening rod are coupled to the other end of the driving shaft 2, while the first rod and cutter are disconnected from the driving shaft 2. The carriage is now returned by the other hand wheel to its original position, thereby cleaning a section of the second half of the tube. A second lengthening rod can now be inserted behind the first cutter, and a further section of the first half of the tube is cleaned on the next stroke. The process is repeated, the action of the carriage in one direction cleaning a section of one half of the pipe, while in the other direction it cleans a part of the other half. There is not as in previous machines an idle stroke, and the pipe is cleaned in both directions almost as rapidly as it was cleaned by the old type of machine, in one direction only.

In Figs. 12 and 13 are shown an arrangement, wherein the supporting rails rest in the bottom of the trench instead of being clamped by the frames 20 to the pipe ends. In these, 5 as before are the pair of rails; 6, an outline of the carriage which contains the engine and gearing and their appurtenances; and 4, the wheels by which the carriage 6 moves along the rails. The rails are secured to the sleepers 57 laid in the bottom of the trench, and to the ends of the pair of rails, is riveted a bar 55 bent into the shape of an arch, so as to bridge over the pipe ends 23. 56, is a bent stay riveted at one end to the rails and at the other end to the bent bar 55 for the purpose of increasing the rigidity of the structure. 19 is the screw shaft and 18 the hand wheels. The apparatus is caused to traverse or roll upon the rails 5, by turning the hand-wheels 18 and thus feed the cutters forward up to their work as in the arrangement already described. The screw shaft 19 on which these hand wheels 18 operate, is firmly bolted at the ends to the pair of bars 55, so that they form a part of the rails for the moving member.

Fig. 15 shows an arrangement wherein the screw shaft 19 is replaced by a fixed rack $19^1$ fastened at ends to the end plates 20 by nuts 22 and passing freely through the moving member. Gearing into this rack is a pinion $18^2$ whose shaft is journaled in bearings bolted to the moving member 6, and $18^1$ is a hand wheel secured to the shaft, by which the moving member can be traveled in either direction.

I declare that what I claim is:—

1. In an apparatus for scraping or cleaning water mains *in situ*, in combination rails adapted to be placed in position between the exposed ends or breaks of the mains near the bottom of the trench, a transverse member at each end of said pair of rails and connected thereto, a member adapted to travel on said rails, a main shaft journaled in said traveling member so as to be centered with respect to the rails, and in line with the pipe, scraping means coupled to the main shaft, mechanism supported by the traveling member for revolving the main shaft and scraping means, a longitudinal rod adapted to be fixed at its ends to the transverse members which are connected with the rails, and means operating on said rod for moving the traveling member upon the rails.

2. Apparatus for scraping or cleaning water mains and the like *in situ*, comprising in combination a pair of rails adapted to be clamped to the exposed ends or breaks of the main near the bottom of a trench, a moving member adapted to travel upon the rails, a main shaft so journaled in the moving member as to be central with respect to the rails and in line with the pipes, scraping means coupled to said main shaft, mechanism supported by the moving member for revolving the main shaft and scraping means, a fixed longitudinal rod, and manually actuated means operating on said rod for traversing the moving member upon the rails.

3. In apparatus for scraping or cleaning water mains and the like *in situ*, a moving member adapted to travel upon rails and mechanism for traversing the moving member upon the rails, said mechanism consisting of a rod having a screw thread thereon clamped at the ends so as to be a fixture and passing freely through the moving member, hand wheels threaded on to said rod and adapted to be brought up to the moving member, so that by turning them the moving member is fed longitudinally.

4. Apparatus for scraping or cleaning water mains and the like *in situ*, comprising in combination a pair of rails adapted to be located near the bottom of a trench, a member adapted to travel on said rails, a main shaft journaled in said member, scraping means coupled to said shaft, means carried by said member for rotating said shaft, a longitudinal rod, means operating on said rod for moving said traveling member on said rails, a pair of end plates each having an opening adapted to receive the end of a pipe, said plates supporting the rails and the longitudinal rod, clamping blocks located within the openings in said plates and set pins working in said plates and acting upon said blocks to bind them against the pipes.

5. Apparatus for scraping or cleaning water mains and the like *in situ*, comprising in combination longitudinal guiding means adapted to be located near the bottom of a trench, a member adapted to travel on said guiding means, a main shaft journaled in said member, a rotary scraper coupled to each end of said shaft, mechanism supported by the traveling member for revolving the main shaft and scrapers, a fixed longitudinal rod, and means operating on said rod for positively moving the traveling member in both directions along the longitudinal guiding means.

6. An apparatus for scraping or cleaning water mains and the like *in situ*, comprising a scraper device embodying a rotary rod or shaft, a sleeve and a shouldered disk fastened on the shaft and spaced apart, blades hinged at one end to the sleeve and at the other prevented by the shoulder from opening more than a given distance, and spring pin devices adapted to keep each blade extended, but permit them to give inward should any solid obstruction be met with.

In witness whereof, I have hereunto signed my name this 17 day of May 1910, in the presence of two subscribing witnesses.

RICHARD A. ADAMSON.

Witnesses:
G. C. DYMOND,
RICHARD WILLIS WILLIAMS.

---

Copies of this patent may be obtained for five cents each, by addressing the "Commissioner of Patents, Washington, D. C."